United States Patent
Yamato et al.

(10) Patent No.: US 6,651,565 B1
(45) Date of Patent: Nov. 25, 2003

(54) METHOD OF REDUCING NOX

(75) Inventors: Yo Yamato, Himeji (JP); Masayuki Yamazaki, Himeji (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 09/446,313

(22) PCT Filed: Feb. 17, 1999

(86) PCT No.: PCT/JP99/00680

§ 371 (c)(1),
(2), (4) Date: Dec. 20, 1999

(87) PCT Pub. No.: WO99/54270

PCT Pub. Date: Oct. 28, 1999

(30) Foreign Application Priority Data

| Apr. 20, 1998 | (JP) | 10-109432 |
| Jun. 18, 1998 | (JP) | 10-170860 |
| Nov. 11, 1998 | (JP) | 10-320269 |

(51) Int. Cl.[7] .......................... C06B 23/02; C06D 5/06; B60R 21/26
(52) U.S. Cl. .................. 102/531; 149/108.4; 149/19.1; 149/36; 149/46; 149/61; 280/741
(58) Field of Search .......................... 149/19.1, 36, 46, 149/61, 108.4; 280/741; 102/531

(56) References Cited

U.S. PATENT DOCUMENTS

| 3,910,805 | A | * | 10/1975 | Catanzarite | 149/75 |
| 4,243,443 | A | * | 1/1981 | Utracki | 149/35 |
| 5,139,588 | A | * | 8/1992 | Poole | 149/61 |
| 5,514,230 | A | | 5/1996 | Khandhadia | |
| 5,557,062 | A | * | 9/1996 | MacLaren et al. | 149/46 |
| 5,669,629 | A | * | 9/1997 | Rink | 280/741 |
| 5,682,014 | A | * | 10/1997 | Highsmith et al. | 149/109.2 |
| 5,756,929 | A | * | 5/1998 | Lundstrom et al. | 149/22 |
| 5,827,996 | A | * | 10/1998 | Yoshida et al. | 149/109.2 |
| 5,951,043 | A | * | 9/1999 | Mooney et al. | 280/736 |
| 5,962,808 | A | * | 10/1999 | Lundstrom | 149/19.1 |
| 6,019,861 | A | * | 2/2000 | Canterberry et al. | 149/19.1 |
| 6,074,502 | A | * | 6/2000 | Burns et al. | 149/36 |
| 6,077,371 | A | * | 6/2000 | Lundstrom et al. | 149/37 |

FOREIGN PATENT DOCUMENTS

| DE | 19505568 A1 | 8/1996 |
| DE | 19819623 A1 | 11/1998 |

(List continued on next page.)

Primary Examiner—Edward A. Miller
(74) Attorney, Agent, or Firm—Birch, Stewart, Kolasch & Birch, LLP

(57) ABSTRACT

A method capable of decreasing the amount of NOx generated by the combustion of a gas generating agent for an air bag.

A method for reducing NOx generated by the combustion of a gas generating agent of an air bag by a reducing material placed inside an inflator and decreasing its amount. $NH_2$ radical, or the like, is generated by the decomposition of the reducing material. The radical is allowed to react with NOx and a part of NOx is changed to the $N_2$ gas. Thus, the amount of NOx is decreased.

8 Claims, 2 Drawing Sheets

FOREIGN PATENT DOCUMENTS

| | | |
|---|---|---|
| EP | 0509763 A1 | 10/1992 |
| EP | 0607446 A1 | 7/1994 |
| EP | 0763512 A1 | 3/1997 |
| JP | A63-502085 | 8/1988 |
| JP | A2-501283 | 5/1990 |
| JP | A2-501284 | 5/1990 |
| JP | A2-225159 | 9/1990 |
| JP | A4-265292 | 9/1992 |
| JP | A5-254977 | 10/1993 |
| JP | A6-32690 | 2/1994 |
| JP | A6-57629 | 8/1994 |
| JP | A6-227884 | 8/1994 |
| JP | A6-239683 | 8/1994 |
| JP | A7-61885 | 3/1995 |
| JP | A7-223890 | 8/1995 |
| JP | A8-301682 | 11/1996 |
| JP | A9-108537 | 4/1997 |
| JP | A9-508095 | 8/1997 |
| JP | A9-328389 | 12/1997 |
| WO | 95 21805 | 8/1995 |
| WO | 9610001 A1 | 4/1996 |
| WO | 9729927 A2 | 8/1997 |
| WO | 98 06682 | 2/1998 |

* cited by examiner

METHOD OF REDUCING NOX

This application is the national phase under 35 U.S.C. §371 of PCT International Application No. PCT/JP99/00680 which has an International filing date of Feb. 17, 1999, which designated the United States of America.

TECHNICAL FIELD WHICH THE PRESENT INVENTION BELONGS

This invention relates to an NOx reducing method for decreasing the amount of NOx generated by the combustion of a gas generating agent for air bag in an inflator of an air bag system installed in automobiles, airplanes, etc, for protecting human bodies.

This invention relates further to an inflator adopting the above NOx reducing method and an inflator system using the above NOx reducing method and the inflator.

PRIOR ART

Sodium azide is well known at present as a combustion component of a gas generating agent used in air bag systems. The gas generating agent using sodium azide has a high decomposition temperature of 400° C. or above and is excellent in thermal stability. This agent has no problem of its combustion characteristics, in particular, and has therefore gained a wide practical application. However, it is known that sodium azide might result in environmental pollution when it is discarded in large quantities because, for example, sodium azide forms explosive compounds upon reacting with heavy metals, and its peroral toxicity $LD_{50}$ of a mouse and a rat is 27 mg/kg.

To solve these problems, novel compounds that may substitute for sodium azide have been examined. For example, JP-B 6-57629 discloses a gas generating agent containing a transition metal complex of tetrazole or triazole. JP-A 5-254977 discloses a gas generating agent containing triaminoguanidine nitrate. JP-A 6-239683 discloses a gas generating agent containing carbohydrazide. JP-A 7-61885 discloses a gas generating agent that contains cellulose acetate, potassium perchlorate and an nitrogen-containing nonmetallic compound. U.S. Pat. No. 5,125,684 discloses a gas generating agent containing 15 to 30% of a cellulose base binder such as nitrocellulose, and an energetic material. JP-A 4-265292 discloses a gas generating composition comprising the combination of tetrazole and triazole derivatives, an oxidizing agent and a slag-forming agent.

A gas generating composition composed of a nitrogen-containing organic compound has, in general, defects such that the heat content is large, a combustion temperature is high, a linear burning rate is small and a trace amount of poisonous gas generates, in comparison with a gas generating composition of an inorganic azide compound when it burns with an oxidizing agent to generate oxygen gas in the stoichiometric amount, that is, in so much an amount as to burn non-oxidized elements such as carbon, hydrogen and others contained in the molecule of the nitrogen-containing organic compound.

Among the gases generated by the combustion of the gas generating agent, it is CO and NOx that render the particular problem. These gases are generated substantially always when organic compounds are burn. When the amount of the organic compound is greater than the theoretical amount of complete oxidation, the trace CO concentration in the generated gas increases, and when the amount of the organic compound is equal to, or smaller than, the theoretical amount of complete oxidation, the trace NOx concentration in the generated gas increases, although the absolute numerical values vary with the kinds of the organic compound and the oxidizing agent used for the gas generating agent. Both of them never reach zero in the combustion of the gas generating agent, and the range within which the optimal balance between them can be maintained must be searched. From the aspect of protection of users, it is demanded that the concentrations of the generated CO and NOx gases should be further reduced, however, no effective method of reducing these has yet to be in practical use. Particularly because the NOx concentration does not much decrease even when the mixing ratio between the organic compound and the oxidizing agent is changed, it is extremely difficult to reduce the NOx concentration.

One of the known NOx reducing methods is a denitration technology in a large-scale process using a boiler and a burner for burning heavy oil, kerosene, coal, propane gas, and so forth. A typical example of this denitration technology is the selective reducing method using $NH_3$ for removing NOx by the following reaction:

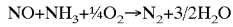

One may attempt to utilize this selective reducing method for the inflator. However, it is not possible to use $NH_3$ which is a gas (boiling point: −33.4° C.) for a reducing agent. The method using urea in place of the $NH_3$ gas is known, but this method cannot be applied to practical application because decomposition and sublimation take place in the high temperature test required for the inflator.

WO98/06682 discloses an NOx reducing method using the reducing material selected from the group consisting of ammonium salts, typified by $(NH_4)_2CO_3$, $(NH_4)_2SO_4$, $NH_4Cl$, $H_2NCO_2NH_4$ and $NH_4F$, ammonium hydroxide, amine compounds, amide compounds, typified by $H_2NCONH_2$, and imide compounds typified by cyanuric acid $(HNCO)_3$. However, these reducing materials involve various problems caused from the factors such that they have low thermal stability and that they are likely to undergo decomposition with the passage of time.

In the thermal stability test at 105° C., for example, the weight loss ratio of both of $(NH_4)_2CO_3$ and $H_2NCO_2NH_4$ after 18 hours was 100%, whereas the weight loss ratio of $H_2NCONH_2$ after 408 hours in the same test was 2.11%. When the reducing materials are decomposed and their weight decreases in this way, a sufficient reduction effect cannot be exhibited, and the rise of the internal pressure due to the generation of the decomposition gas may break the seal of the vessel. Furthermore, ammonia and amino radicals, etc. as the decomposition gas of the reducing materials have high reactivity, so that the decomposition of the gas generating agent itself is induced and therefore, service life of the inflator is shortened. Incidentally, though cyanuric acid is hardly decomposed by heat, its reducing power is low as is obvious from its structure. Therefore, its NOx reducing effect is small.

The reducing materials disclosed in WO98/06682 generate harmful gases to the human body upon decomposition. For example, $H_2S$ and $SO_x$ are generated from $(NH_4)_2SO_4$; HCl and $Cl_2$ are generated from $NH_4Cl$; and $H_2F$ and $F_2$ are generated from $NH_4F$. Leak of these harmful gases outside the inflator system cannot be neglected when the influences on the human body are taken into consideration, and also lowers safety of the system as a whole.

DISCLOSURE OF INVENTION

It is an object of the present invention to provide a NOx reducing method, in an inflator of an air bag system, such that the amount of the NOx generated by the combustion of a gas generating agent for the air bag can be reduced, and therefore, safety can be further improved in view of the protection of users.

In the inflator for the air bag, the method of the present invention reduces NOx, generated by the combustion of the gas generating agent, using a reducing material or its decomposition products, and reduces the amount of these NOx.

The inflator generally includes a ignition means, the gas generating agent and a coolant/filter.

Preferably, the reducing material is placed in an ignition means accommodation chamber, or in a combustion chamber storing the gas generating agent, or at a position in the proximity of a gas outlet from the ignition means accommodation chamber inside the combustion chamber that stores the gas generating agent, or at a coolant/filter portion.

Preferred examples of the reducing materials include amide compounds, imide compounds, amine compounds, guanidine derivatives, tetrazole derivatives, hydrazine derivatives, triazine derivatives, hydroxylamine salts, sodium salts, $NH_4OH$, ammonium salts, cyanates, dicyanamide salt, ammine complexes and CDH complexes. More concretely, they include azodicarbonamide, dicyandiamide, tetrazole compounds or their salts, bitetrazole compounds or their salts, and triazole compounds or their salts. More preferably, they include the mixture of the tetrazole compounds or their salts with copper oxides. Among the tetrazole compounds, 5-aminotetrazole is most preferred.

The reducing materials includes the form of at least one member selected from the group consisting of amide compounds, guanidine derivatives, tetrazole derivatives, hydrazine derivatives, triazine derivatives, hydroxylamine salts, sodium salts, ammonium salts, ammine complexes, cyanates and dicyanamide salts.

The reducing materials may be molded articles.

The present invention provides further an inflator for an air bag that includes a gas generating agent and a reducing material. The inflator comprises a ignition means, the gas generating agent and a coolant/filter, and further includes preferable factor such that the gas generating agent and the reducing material are placed apart from each other by a partition plate to be ruptured by the gas pressure generated at the time of combustion.

The present invention further provides an air bag system comprising the inflator, an impact sensor, control means for inputting a detective signal and outputting an operation signal to the ignition means of the inflator and an air bag. The present invention further provides a method of reducing NOx, generated by the combustion of the gas generating agent, using a reducing material and reducing their amount adopted bin the air bag system.

To find a suitable method of reducing NOx, the inventors of the present invention has made studies specifically aiming at the selective reducing method using urea, and has found that the objects of the invention described above can be accomplished by utilizing the reaction between radicals and NOx on the basis of the concept that the NOx reducing mechanism by urea results from the reaction between radicals such as $NH_2$ radicals, NCO radicals, CN radicals, alkyl radicals, and so forth, with NOx, and a part of NOx is changed to the $N_2$ gas. The present invention has thus been completed.

In other words, the present invention provides the NOx reducing method characterized in that NOx generated by the combustion of the gas generating agent for the air bag is reduced by the reducing material placed inside the inflator and their amount is reduced.

The present invention further provides an inflator comprising a gas generating agent and a reducing material.

The present invention provides further an inflator system using the NOx reducing method or the inflator described above.

When the NOx reducing method according to the present invention is employed, it becomes possible to reduce the NOx generated by the combustion of the gas generating agent for the air bag by the reducing material placed inside the inflator, and to thus reduce the NOx amount. The reducing material used for the NOx reducing method according to the present invention has higher thermal stability than that of the reducing materials of the prior art which are different from the reducing material of the present invention. Moreover, the reducing materials of the present invention hardly generate poisonous gases.

Therefore, when the NOx reducing method, and the inflator using this method, according to the present invention are employed, the possibility of adverse influences on the health of users can be lowered, and reliability as well as safety of the inflator system can be further enhanced.

PREFERRED EMBODIMENTS OF THE PRESENT INVENTION

Figure 1:
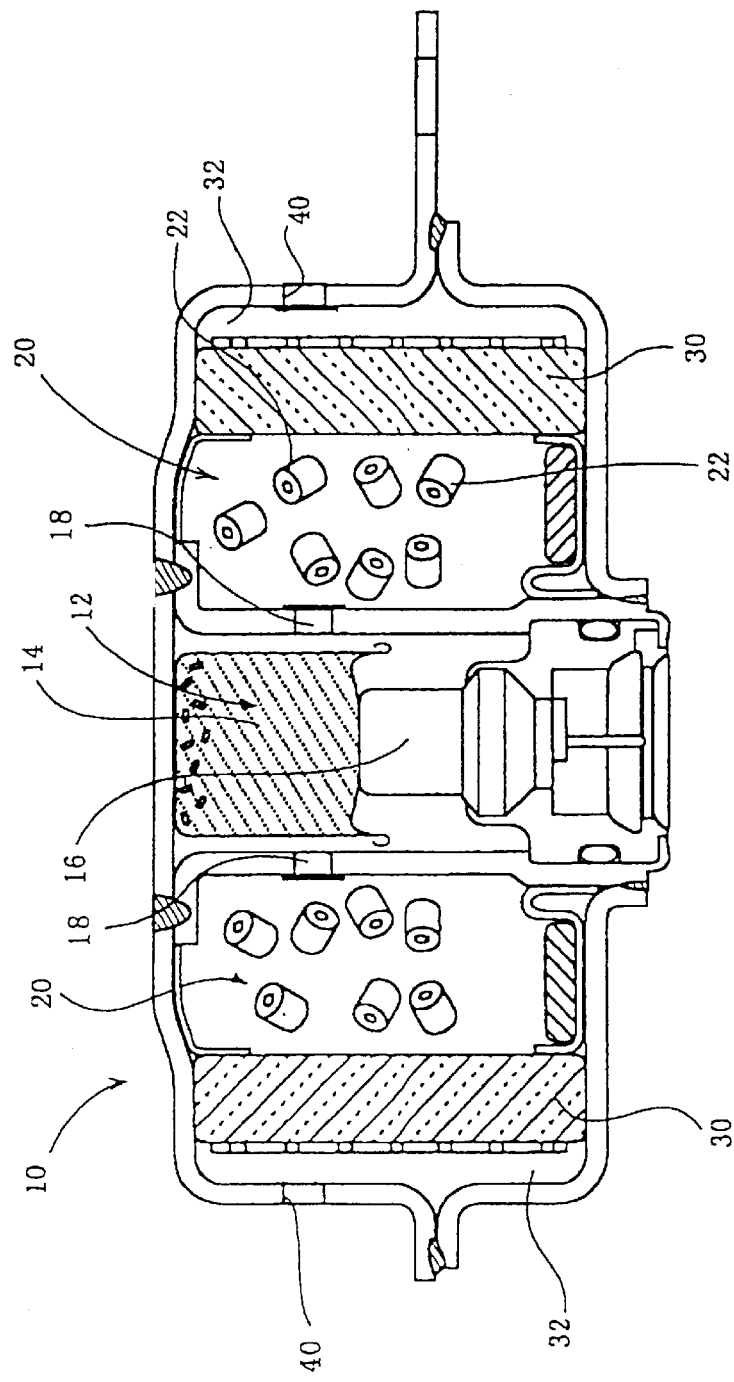
FIG. 1 is a schematic sectional view of an inflator, in its diameter direction, to which an NOx reducing method of the present invention is applied.

The reducing material used in the present invention preferably has high thermal stability and readily generates radicals upon decomposition as described above. Such a reducing material is at least one member selected from the group consisting of amide compounds such as azodicarbonamide (ADCA) and biurea; guanidine derivatives such as dicyandiamide (DCDA) and guanidine nitrate; tetrazole derivatives such as 5-aminotetrazole (5-AT) and 5-aminotetrazole metal -salts; bitetrazole derivatives such as bitetrazol, bitetrazole -metal salts and bitetrazole ammonium salts; hydrazine derivatives, e.g., trihydrazinotriazine (THT), carbohydrazide (CDH) complex such as $Mg(CDH)_3(NO_3)_2$, $Zn(CDH)_3(NO_3)_2$, and $Mn(CDH)_3(NO_3)_2$, hydrazine complex and oxalyldihydrazide; triazine derivatives such as melamine; salts of hydroxylamine such as hydroxylamine oxalate and sodium salts such as sodium oxalate; cyanates such as sodium cyanate; ammonium salts such as ammonium molybdate; amine complexes such as $Cu(NH_3)_4(NO_3)_2$, $Co(NH_3)_6(NO_3)_3$ and $Zn(NH_3)_2(NO_3)_2$; and dicyanamide salts such as sodium dicyanamide.

The reducing material is preferably azodicarbonamide, dicyandiamide, 5-aminotetrazole, 5-aminotetrazole sodium salt, 5-aminotetrazole potassium salt, 5-aminotetrazole zinc salt, bitetrazole, bitetrazole ammonium salt, bitetrazole sodium salt, bitetrazole potassium salt, trihydrazinotriazine and the carbohydrazide complex because these materials are easily available and economical and have low toxicity.

Particularly preferred examples of the reducing material are azodicarbonamide, 5-aminotetrazole or 5-aminotetrazole's metal salts because they generate extremely efficiently the $NH_2$ radical ($.NH_2$) as shown in the following reaction formulas.

$$ADCA \rightarrow 2.CONH_2+N_2.CONH_2 \rightarrow CO+.NH_2 \quad \text{(ADCA)}$$

$$5\text{-}AT \rightarrow .CHN_4+NH_2 \quad \text{(5-AT)}$$

In the present invention, the reducing material can be used in combination with a material (such a reducing catalyst) functioning as a reducing catalyst. Examples of the materials functioning as the reducing catalyst include copper oxide, iron oxide, chromium oxide, nickel oxide, cobalt oxide and copper chromite. An example of the combination of the reducing material and the reducing catalyst is the combination of 5-aminotetrazole and copper oxide. These compounds are preferably used as a mixture. When such a combination system is used as the reducing material, NOx is reduced by ammonia and amino radicals, etc. generated by the decomposition of 5-aminotetrazole, and is also reduced by the reaction between NOx and hydrogen, methane, etc, generated by the decomposition of 5-aminotetrazole. Therefore, the reducing effect can be enhanced synergistically, and the absolute amount of use of the reducing material can be decreased. Furthermore, the ammonia concentration in the gas after the reduction can be prevented from becoming excessively high.

The preferred compounding ratio of the reducing material and the reducing catalyst, when they are used in combination, is such that the reducing catalyst is 0.01 to 200 parts by weight and particularly preferably, 5 to 100 parts by weight on the basis of 100 parts by weight of the reducing material.

The reducing material can be used in the powder form. However, if necessary, it may be formed, either alone or with a small amount of a binder, into a suitable shape such as a granule, a pellet, a disk, a single-hole mold (macaroni shape), and so forth, or, for example, may be supported by a suitable support in order to increase the surface area.

The fuel of the gas generating composition is not limited, in particular. Preferred examples include guanidine derivatives such as dicyandiamide (DCDA) and nitroguanidine (NQ); amide compounds such as azodicarbonamide (ADCA); tetrazole derivatives such as aminotetrazole and 5-aminotetrazole; triazole derivatives; and CDH complexes such as $Zn\,(CDH)_3(NO_3)_2$. Examples of the oxidizing agents are alkali metal salts, alkaline, earth metal salts, ammonium salts, etc, of nitric acid, nitrous acid, chloric acid and perchloric acid. The gas generating composition may further contain a slag-forming agent, a binder and other additives.

The amount of use of the reducing materials is preferably 0.1 to 20 parts by weight, particularly preferably 0.5 to 10 parts by weight, on the basis of 100 parts by weight of the gas generating agent. If the amount of use of the reducing materials is not less than 0.1 parts by weight, the NOx reducing effect can be improved. If it is not more than 20 parts by weight, the combustion of the gas generating agent is not impeded while a high NOx reducing effect is maintained.

In the NOx reducing method according to the present invention, if a sufficient contact can be kept between the reducing material and the generated NOx, the position where the reducing material is placed is not limited in particular, as long as it is placed inside the inflator.

In the present invention, the reducing material may be mixed with the gas generating agent but it is preferable that the reducing material positioned separately, without mixing with the gas generating agent. When a molded reducing material is used as the reducing material, it maybe mixed with the molded article of the gas generating agent, or they may be placed separately.

More concretely, the reducing material can be used in the following forms in the present invention.

(1) The non-molded gas generating agent in a powder form and the non-molded reducing material in a power form, and/or the reducing material molded into a pellet, a single-hole shape, a porous shape or other shapes, are placed, being mixed either wholly or only partially.

(2) The non-molded gas generating agent in a powder form and the non-molded reducing material in a powder form and/or the reducing material molded into a pellet shape, a single-hole shape, a porous shape or other shapes, are placed separately from one another.

(3) The gas generating agent molded into a pellet shape, a single-hole shape, a porous shape or other shapes, and the non-molded reducing material in a powder form, etc. and/or the reducing material molded into a pellet shape, a single-hole shape, a porous shape or other shapes, are placed, being mixed either wholly or only partially.

(4) The gas generating agent molded into a pellet shape, a single-hole shape, a porous shape or other shapes, and the non-molded reducing material in a powder form, etc. and/or the reducing material molded into a pellet shape, a single-hole shape, a porous shape or other shapes, are placed separately.

Means for preventing the change (inclusive of the drop) of the NOx reducing effect by the reduction material or its variance can be employed.

This prevention means includes means for preventing the movement of the gas generating agent or/and the reducing material, means for preventing mixing of the gas generating agent and the reducing material to such an extent as to affect the NOx reducing effect, or means for isolating the gas generating agent and the reducing material from each other (either completely or partially). These prevention means prevent the change or variance of the NOx reducing effect by preventing the movement or the mixing described above or by attaining the isolation defined above.

The prevention means may be the one that does not affect the NOx reducing reaction and does not either affect combustibility of the gas generating agent and/or the reducing material.

Further, the prevention means described above may have a property such that it is ruptured by the gas pressure generated by the combustion of the gas generating agent and/or the reducing material, or burns simultaneously with, or before, or after, the combustion of the gas generating agent and/or the reducing material.

Each of the gas generating agent and the reducing material need not be disposed at one position, but may be placed dividedly at two or more positions. In such a case, two or more prevention means can be employed.

The prevention means may be a partition plate or a mesh, for example. They may be made of a metal or plastic material, such as aluminum, silicon, iron, stainless steel and various polymer materials. Among them, aluminum or silicon is a preferred material. In the case of the aluminum partition plate, its thickness is preferably from about 30 to about 200 $\mu$m and more preferably, from about 30 to about 100 $\mu$m. In the case of the silicon plate, its thickness is preferably from about 1 to about 3 mm and further preferably from about 1 to about 2 mm.

Next, the NOx reducing method according to the present invention will be explained with reference to the inflator shown in FIGS. 1 and 2. The inflator in these drawings is shown merely for the purpose of explaining the NOx reducing method according to the embodiment of the present invention. In other words, the application object of the NOx reducing method of the present invention is not particularly limited to the inflator having the construction shown in FIGS. 1 and 2, and the construction itself of the inflator is not particularly limited, either, to the one shown in these drawings.

In an embodiment for executing the NOx reducing method of the present invention, the reducing material is placed inside an ignition means accommodation chamber (enhancer chamber) 12 in the inflator 10. The ignition means accommodation chamber (enhancer chamber) 12 comprises a small partitioned chamber. It is an ideal place particularly when the reducing material in a powder form is handled. Reference numeral 14 denotes an enhancer assembly and reference numeral 16 denotes an initiator.

In another embodiment for executing the NOx reducing method of the present invention, the reducing material is placed inside a gas generating agent combustion chamber 20 in the inflator 10. Because the inside of the gas generating agent combustion chamber 20 will be exposed to a high temperature and a high pressure due to the combustion of the gas generating agent 22, the reaction between the $NH_2$ radicals generated by the promotion of the decomposition, and the decomposition itself, of the reducing material, and the NOx can be promoted desirably. In this embodiment, it is particularly preferred to position the reducing material in the proximity of a gas outlet 18 from the ignition means accommodation chamber 12 inside the gas generating agent combustion chamber 20.

In still another embodiment for executing the NOx reducing method of the present invention, the reducing material is placed inside a coolant/filter 30 in the inflator 10. When the reducing material is placed inside the coolant/filter 30, the reducing material can be directly dusted on the filter. Alternatively, after the reducing material is dissolved or suspended in a solvent, the filter is immersed and is then dried.

When the NOx reducing method of the present invention is applied to the inflator in this way, NOx generated by the decomposition of the gas generating agent 22 reacts with the $NH_2$ radical, etc, generated by the decomposition of the reducing material. In this case, a part of the NOx is turned to the $N_2$ gas. Thus, the amount of the NOx can be reduced. After the amount is so reduced, the gas is discharged from a gas discharge port 40 through a clearance (gas flow passage) 32 and instantaneously inflates the air bag.

Next, the inflator according to the present invention will be explained with reference to FIG. 2, which is a schematic sectional view of the inflator of the present invention.

The gas generating agent 122 and the reducing material 124 are placed inside the gas generating agent combustion chamber 120 in the inflator 100. The placing position of the reducing material 124 is not particularly limited, but the reducing material 124 is preferably disposed in the proximity of the gas outlet 118 from the ignition means accommodation chamber (enhancer chamber) 112 so that the reducing material 124 can sufficiently exhibit its function.

A partition plate 160, to be ruptured by the gas pressure occurring at the time of the combustion, can be interposed between the gas generating agent 122 and the reducing material 124, as means for preventing the change (inclusive of the drop) and the variance of the NOx reducing effect by the reducing material. Each of the gas generating agent and the reducing material need not be placed in one lot at one position but may be disposed dividedly at two or more positions. In such a case, two or more partition plates can be used. This partition plate 160 is ruptured instantaneously by the gas pressure occurring at the time of the combustion, that is, by the gas pressure generated by the combustion of either one, or both, of the gas generating agent 122 and the reducing material 124, but is not ruptured by the vibration applied thereto during driving of the automobile (or in other words, by a pressure smaller than the gas pressure generated upon combustion). This partition plate 160 may be ruptured by only the gas pressure generated at the time of combustion, for example. The partition plate 160 having such strength is made of aluminum, silicon, iron, stainless steel or various polymer materials, but is preferably made of aluminum or silicon among them. If the partition plate 160 is an aluminum plate, it is preferably about 30 to 200 μm thick and more preferably, about 30 to about 100 μm thick. When it is a silicon plate, it is preferably about 1 to about 3 mm thick and more preferably about 1 to about 2 mm thick.

Figure 2:
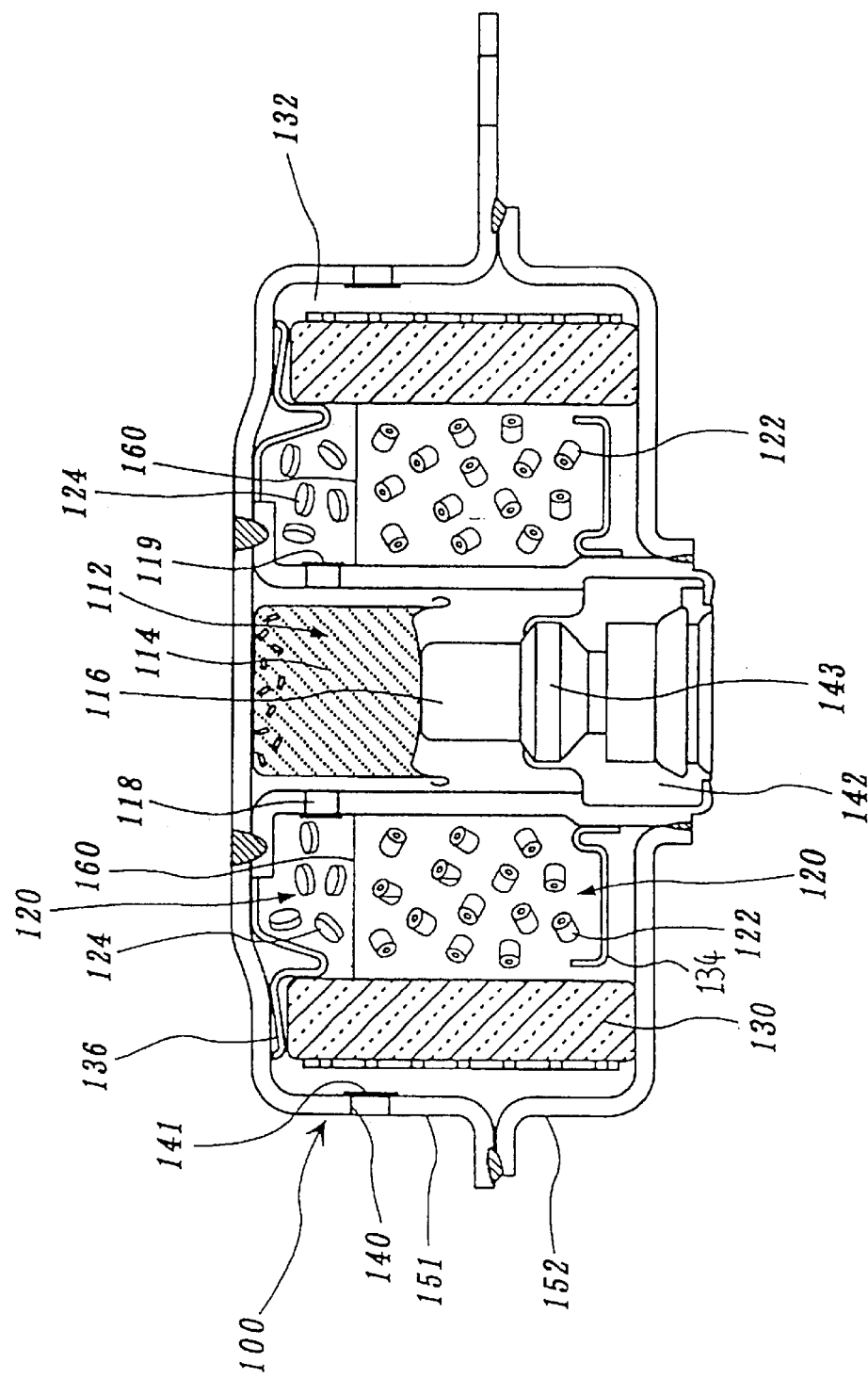
FIG. 2 is a schematic sectional view of the inflator according to the present invention in its diameter direction.

When the inflator according to the present invention is constituted into the construction shown in FIG. 2, the gas generating agent 122 and the reducing material 124 are prevented from moving due to the vibration applied to them during driving of the automobile and from impinging against or mixing with each other. In consequence, the function of the inflator is not spoiled even after the passage of a long time. Because the partition plate 160 readily ruptures due to the gas pressure generated at the time of combustion, the NOx reducing operation by the reducing material 124 can be sufficiently exhibited. When the reducing material 124 is positioned in the proximity of the gas outlet 118 from the ignition means accommodation chamber 112, the reducing material 124 is first burnt and decomposed to generate the radicals. Next, the partition plate 160 ruptures due to the combustion pressure of the reducing material 124, and the gas generating agent 122 then burns in the atmosphere filled with the radicals. In consequence, the NOx reducing function is exhibited more remarkably.

In FIG. 2, reference numeral 114 denotes an enhancer assembly. Reference numeral 116 denotes an initiator. Reference numeral 119 denotes a seal tape. Reference numeral 130 denotes a coolant/filter. Reference numeral 132 denotes a gas flow passage. Reference numeral 134 denotes an under-plate. Reference numeral 136 denotes a coolant supporter. Reference numeral 140 denotes an gas discharge port. Reference numeral 141 denotes a seal tape. Reference numeral 142 denotes an initiator collar. Reference numeral 143 denotes an initiator assembly. Reference numeral 151 denotes a diffuser. Reference numeral 152 denotes a closure.

The NOx reducing method and the inflator according to the present invention are mounted to automobiles and airplanes, and are used for protecting human bodies. They can be applied to an inflator system comprising a module case for accommodating the inflator and the airbag, a judgement circuit, a sensor, and so forth.

EXAMPLES

Hereinafter, the present invention will be explained more concretely with reference to Examples and Comparative Examples, which are merely illustrative but in no way restrictive.

Production Example 1

15 parts by weight of water was added to 32.4 parts by weight of nitroguanidine, 57.6 parts by weight of strontium nitrate and 10 parts by weight of carboxymethyl cellulose sodium salt, and kneadingly mixed. The kneaded mixture was then extruded, cut and molded to a mold having an outer diameter of 2.5 mm, an inner diameter of 0.8 mm and a length of 2.25 mm. The mold was sufficiently dried to give a gas generating agent.

Examples 1 to 6 & Comparative Example 1

The NOx reducing method was carried out by placing each reducing material in the powder form shown in Table 1 in the ignition means accommodation chamber or in the gas generating agent combustion chamber of the inflator having the construction shown in FIG. 1. Incidentally, the combustion test was carried out at room temperature by installing the inflator using 41.9 g of the gas generating agent and 1 g of the enhancer ($B/KNO_3$), that were obtained in Production Example 1, into a 2,800-liter tank. Analysis of CO and NOx was conducted using a detector tube at 30 minutes after the start of the operation of the inflator. The result was shown in Table 1.

Examples 7 to 11

The gas analysis inside the 2,800-liter tank was conducted in the same way as in Examples 1 to 6 with the exception that the pellet (diameter: 5 mm, thickness: 1.2 mm) of 5-aminotetrazole (5-AT) or a bitetrazole ammonium salt was positioned in the proximity of the outlet of the ignition means accommodation chamber of the gas generating agent combustion chamber. The result was shown in Table 1.

Example 12 to 13

5-AT and copper(II) oxide (CuO) powder were mixed at weight ratios of 5-AT/CuO=90/10 (Example 12) and 5-AT/CuO=70/30 (Example 13), and each mixture was molded into a pellet (diameter: 5 mm, thickness: 1.2 mm). The gas analysis inside the 2,800-liter tank was conducted using each pellet in the same way as in Examples 7 to 11. The result was shown in Table

Test Example (Thermal Stability Test)

Compounds 1 to 17 corresponding to the reducing materials used in the present invention and compounds 1 to 8 corresponding to the reducing materials used in the prior art (WO98/06682) were preserved in the atmosphere of 105° C., respectively, to measure the relation of their left-standing time and the weight loss ratio. The result was shown in Table 2.

Example 14 and Comparative Example 2

A pellet was obtained from 38 g of the gas generating agent prepared in Production Example 1, 1 g of the enhancer ($B/KNO_3$) and 3 g of 5-AT as the reducing materials. The resulting pellets were separately placed into the gas generating agent combustion chamber of the inflator equipped with an aluminum partition plate (50 $\mu$m thick) as shown in FIG. 2 (122 and 124 in FIG. 2). This inflator was oscillated for 200 hours using a composite vibration tester (VS-1500-10; product of IMV) under the condition of a vibration intensity of 10 to 1000 Hz, 2 octave/min and amplitude of 3G. As Comparative Example 2, the inflator was oscillated under the same condition with the exception that the inflator used did not have the partition plate.

After oscillation, each inflator was placed inside a 60-liter tank and a combustion test was carried out at room temperature. The analysis of the gas components after combustion was conducted using a 2,800-liter tank. The result was shown in Table 3.

As was obvious from Table 3, the tank maximum pressure of Example 14 was equal to the tank maximum pressure when the inflator before the oscillation was subject to combustion. It could be thus confirmed that the use of the partition plate could prevent the change of the combustion pressure, that is, the change of inflator performance.

Example 15

The combustion test was carried out in the same way as in Example 1 with the exception that 3.0 g of a zinc salt of 5-aminotetrazole as the reducing material and 37.0 g of the gas generating agent obtained in Production Example 1 were used. As a result, the maximum pressure inside the inflator was 162 kg/cm$^2$), the NOx concentration was 37. (ppm) and the CO concentration was 190 (ppm).

Example 16

The combustion test was carried out in the same way as in Example 1 with the exception that 2.0 g of 5-aminotetrazole as the reducing material and 34.5 g of $Zn(CDH)_3(NO_3)_2$ (CDH: carbodihydrazide) as the gas generating agent were used. As a result, the maximum pressure inside the inflator was 185 (kg/cm$^2$) and the NOx and CO concentrations were 19 (ppm) and 210 (ppm), respectively.

TABLE 1

| | Reducing material | Installation position of reducing material | Maximum pressure inside inflator kg/cm$^2$ | Nox ppm | CO ppm |
|---|---|---|---|---|---|
| Ex. 1 | ADCA 2.7 g | Gas generating agent combustion chamber | 132 | 27 | 210 |
| Ex. 2 | ADCA 1.8 g | Ignition means accommodation chamber | 184 | 60 | 160 |
| Ex. 3 | DCDA 0.65 g | Gas generating agent combustion chamber | 151 | 45 | 200 |
| Ex. 4 | DCDA 1.14 g | Ignition means accommodation chamber | 167 | 60 | 160 |
| Ex. 5 | 5-AT 0.65 g | Gas generating agent combustion chamber | 136 | 56 | 180 |
| Ex. 6 | 5-AT Na salt 0.8 g | Gas generating agent combustion chamber | 71 | 56 | 200 |
| Ex. 7 | 5-AT 1.5 g | Gas generating agent combustion chamber | 146 | 36 | 180 |
| Ex. 8 | 5-AT 3.0 g | Gas generating agent combustion chamber | 155 | 22 | 180 |
| Ex. 9 | 5-AT 4.5 g | Gas generating agent combustion chamber | 161 | 10 | 190 |
| Ex. 10 | bitetrazole diammonium salt 3.0 g | Gas generating agent combustion chamber | 150 | 25 | 180 |
| Ex. 11 | bitetrazole diammonium salt 4.5 g | Gas generating agent combustion chamber | 162 | 12 | 190 |
| Comp. Ex. 1 | None | — | 138 | 63 | 160 |
| Ex. 12 | 5-AT + CuO 5.0 g | Gas generating agent combustion chamber | 95 | 6 | 240 |
| Ex. 13 | 5-AT + CuO 4.4 g | Gas generating agent combustion chamber | 120 | 5 | 220 |

TABLE 2

| | | Left-standing time (hr) | Weight loss ratio (%) |
|---|---|---|---|
| | | This Invention | |
| 1 | ADCA | 382 | −0.43 |
| 2 | 5-AT | 384 | 0.00 |
| 3 | Biurea | 412 | −0.10 |
| 4 | DCDA | 384 | −0.01 |
| 5 | guanidine nitrate | 384 | −0.04 |

TABLE 2-continued

| | | Left-standing time (hr) | Weight loss ratio (%) |
|---|---|---|---|
| 6 | bitetrazole ammonium salt | 431 | −0.09 |
| 7 | bitetrazole sodium salt | 431 | 0.00 |
| 8 | bitetrazole potassium salt | 431 | −0.13 |
| 9 | THT | 412 | −0.36 |
| 10 | $Mg(CDH)_3(NO_3)_2$ | 525 | −0.08 |
| 11 | $Zn(CDH)_3(NO_3)_2$ | 482 | 0.00 |
| 12 | $Mn(CDH)_3(NO_3)_2$ | 505 | −0.16 |
| 13 | Oxalyldihydrazide | 408 | −0.42 |
| 14 | Melamine | 408 | −0.02 |
| 15 | Sodium oxalate | 408 | −0.01 |
| 16 | Ammonium molybdate | 387 | −0.02 |
| 17 | Sodium dicyanamide | 408 | −0.01 |
| Prior Art | | | |
| 1 | $NH_4OH$ | test was not possible | |
| 2 | $(NH_4)_2CO_3$ | 18 | −100.00 |
| 3 | $(NH_4)_2SO_4$ | 408 | −0.05 |
| 4 | $NH_4Cl$ | 408 | −0.07 |
| 5 | $H_2NCO_2NH_4$ | 18 | −100.00 |
| 6 | $NH_4F$ | 408 | −4.72 |
| 7 | $H_2NCONH_2$ | 408 | −2.11 |
| 8 | $(HNCO)_3$ | 408 | −0.08 |

TABLE 3

| | Tank max. pressure (kPa/60 L) | Gas components (ppm) | | | |
|---|---|---|---|---|---|
| | | $NO_2$ | NO | CO | $NH_3$ |
| Ex. 14 | 175 | 10 | 60 | 600 | 130 |
| Comp. Ex. 2 | 192 | 10 | 60 | 570 | 130 |

What is claimed is:

1. A method of reducing NOx, the method comprising:

burning a gas generating agent to produce a combustion gas including NOx inside an inflator for an air bag, the inflator comprising an ignition means, a gas generating agent, a partition plate and a coolant/filter; and contacting the NOx with a reducing material comprising 5-aminotetrazole, wherein the gas generating agent and the partition plate are accommodated in a combustion chamber, and the gas generating agent and the reducing material are separated by the partition plate.

2. The method according to claim 1, wherein said reducing material is in the proximity of a gas outlet from an ignition means accommodation chamber.

3. The method according to claim 1, wherein said reducing material further comprises copper oxide.

4. The method according to claim 1, wherein said reducing material is molded into an article.

5. The method according to claim 1, wherein said partition plate prevents said gas generating agent and said reducing material from mixing with each other to such an extent as to affect the NOx reducing effect.

6. The method according to claim 1, wherein said partition plate does not affect a reaction of said reducing agent with said NOx.

7. The method according to claim 1, wherein said partition plate is made of a metal or a plastic.

8. The method according to claim 1, wherein said partition plate is made of aluminum or silicon.

* * * * *